United States Patent [19]

Ward et al.

[11] 4,024,823
[45] May 24, 1977

[54] AUTOMATIC BLADE ANGLE CONTROLLER SYSTEM

[75] Inventors: Carter J. Ward, Ventura; Kwang-Ta Huang, Port Hueneme; George W. Byrd, Oxnard, all of Calif.

[73] Assignee: The United States of America as represented by the Secretary of the Navy, Washington, D.C.

[22] Filed: June 24, 1974

[21] Appl. No.: 482,291

[52] U.S. Cl. .................................. 172/4.5; 33/366; 33/378
[51] Int. Cl.² ...................... E02F 3/76; G01C 9/06
[58] Field of Search .................. 172/4.5, 4; 33/366, 33/378

[56] References Cited
UNITED STATES PATENTS

| | | | |
|---|---|---|---|
| 375,450 | 12/1887 | Karr | 33/378 |
| 2,547,310 | 4/1951 | Flint | 33/366 |
| 2,941,319 | 6/1960 | Beemer et al. | 172/4.5 |
| 3,026,638 | 3/1962 | Hayner et al. | 172/4.5 |
| 3,454,101 | 7/1969 | Breitbarth et al. | 172/4.5 |

*Primary Examiner*—Stephen C. Pellegrino
*Attorney, Agent, or Firm*—Richard S. Sciascia; Joseph M. St.Amand; Darrell E. Hollis

[57] ABSTRACT

An automatic blade angle controller system capable of maintaining a blade on an earth-working tool level with the ground. A transparent, closed manometer partially filled with an opaque liquid is contained in an opaque enclosure. A light source is located within the perimeter of the manometer. Two solar cells are located on opposite sides of the enclosure in such manner that the light from the light source must pass through the manometer before impinging on the solar cells. The opaque liquid partially blocks the light from impinging on the solar cells. The voltages from the solar cells are subtracted resulting in an error signal. Of course, when the two voltages are of equal value, no error signal is produced, thereby establishing a level reference position for the enclosure. The enclosure is rigidly affixed to the blade, thereby establishing a reference position for the blade. A servo-hydraulic system returns the blade to its reference position upon receipt of the error signal.

5 Claims, 10 Drawing Figures

AUTOMATIC BLADE ANGLE CONTROLLER SYSTEM

BACKGROUND OF THE INVENTION

1. Field of the Invention

The present invention relates generally to earth-working implements and more particularly to an apparatus for automatically maintaining the blade of an earth-working implement in a level position.

2. Description of the Prior Art

Most prior art angle or level controllers utilize a damped pendulum, a mercury switch or a pressure head transducer with various electrical circuits to detect the angle of the blade relative to the gravity vector. All such systems are subject to large errors due to the shocks and vibrations commonly encountered on earth-working equipment. As a result, such prior art devices are either extremely unstable or extremely slow in response. Some exhibit hysteresis effects and all are expensive and complex.

SUMMARY OF THE INVENTION

The general purpose of the present invention is to provide an automatic blade angle controller system that is extremely fast in response, highly stable, eliminates hysteresis effects, is simple and inexpensive, and is extremely accurate. To attain this, the present invention provides a transparent, closed manometer partially filled with an opaque liquid contained in an opaque enclosure. A light source is located within the perimeter of the manometer. Two solar cells are located on opposite sides of the enclosure in such manner that the light from the light source must pass through the manometer before impinging on the solar cells. The opaque liquid partially blocks the light from impinging on the solar cells. Opaque floats may be utilized to eliminate meniscus effects. The voltages from the solar cells are subtracted, resulting in an error signal. Of course, when the two voltages are of equal value, no error signal is produced, thereby establishing a level reference position for the enclosure. The enclosure is rigidly affixed to the blade, thereby establishing a reference position for the blade. A servo-hydraulic system returns the blade to its reference position upon receipt of the error signal.

Accordingly, one object of the present invention is to provide high stablility.

Another object of the present invention is to provide extremely fast response.

Another object of the present invention is to eliminate hysteresis effects.

Another object of the present invention is to reduce cost and complexity.

Another object of the present invention is to maximize response and minimize overshoot.

Another object of the present invention is to reduce maintenance.

Another object of the present invention is to maximize accuracy of angle readings.

Another object of the present invention is to maintain a controlled member in a reference position with respect to a level reference position.

Another object of the present invention is to indicate the angle of displacement of a surface with respect to a reference position.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

DETAILED DESCRIPTION OF THE PREFERRED EMBODIMENT

Figure 1:
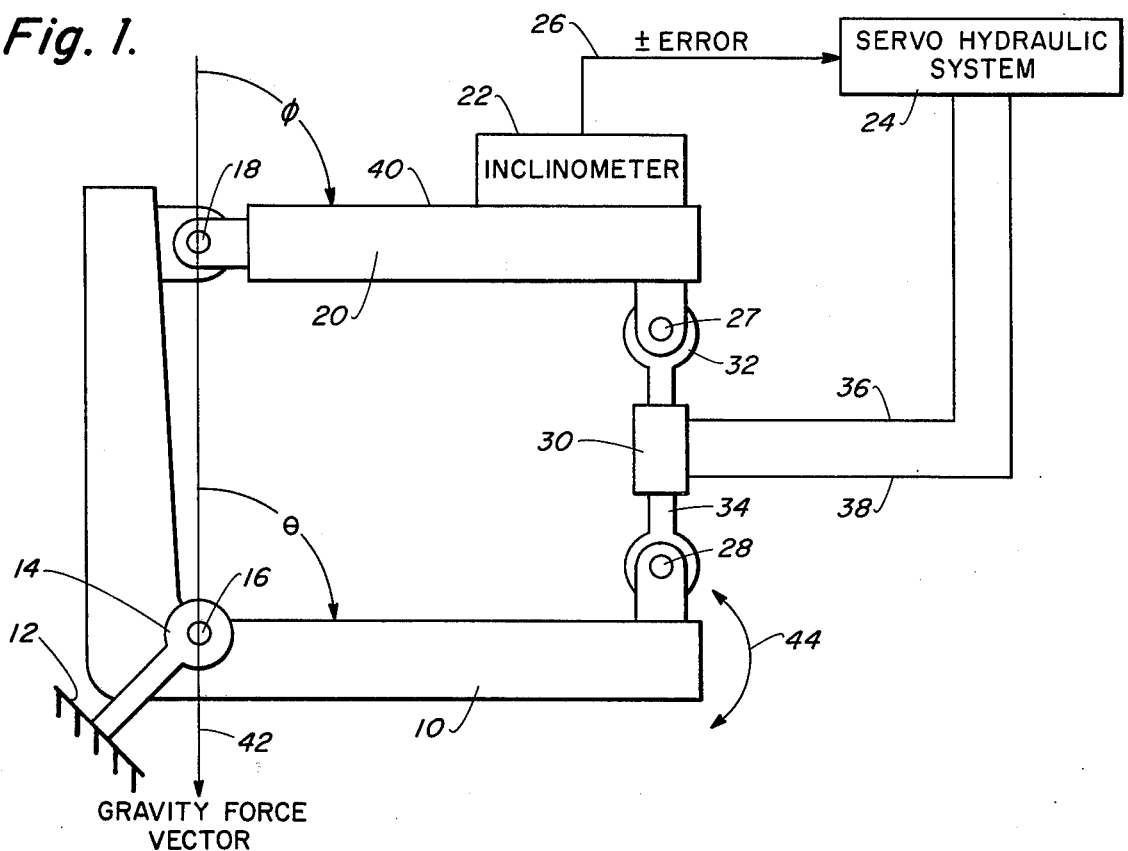
FIG. 1 illustrates a generalized system of the present invention.

Turning to FIG. 1, a support member 10 is shown pivotally attached at point 16 to a fixed object 12 by pivotal member 14. Also, pivotally connected to support member 14 at pivot point 18 is controlled member 20.

Rigidly affixed to controlled member 20 is inclinometer 22. Inclinometer 22 electrically communicates with servo-hydraulic system 24 via line 26.

Pivotally connected between support member 10 and controlled member 20 at pivot points 27 and 28 is hydraulic ram 30. Hydraulic ram 30 has push rods 32 and 34. Hydraulic ram 30 communicates with servo-hydraulic system 24 via lines 36 and 38. Servo-hydraulic systems such as servo-hydraulic system 24 are well known to those having ordinary skill in the art. For example, such systems can be found illustrated in the *Fluid Power Handbook and Directory* by the Editors of Hydraulics and Pneumatics (1973 and 1974). In particular, see page A/238 and the section entitled "Electrohydraulics Servo Circuits" of the above cited publication.

Controlled member 20 is in its reference position. As shown in FIG. 1, the angle $\phi$ between gravitational force vector 42 and surface 40 of controlled member 20 is 90°. As will be discussed infra, inclinometer 22 is in its level reference position with no error signal appearing on line 26. The angle $\theta$ between gravitational force vector 42 and support member 10 is also 90°.

When support member 10 is moved either upward or downward, as illustrated by arrow 44, inclinometer 22 is displaced from its level reference position. When displaced, inclinometer 22 outputs an error signal on line 26 to servo-hydraulic system 24. Acting in response to the error signal of line 26, servo-hydraulic system 24 actuates hydraulic ram 30 via either line 36 or 38. Hydraulic ram 30 then moves either push rod 32 or 34 which forces surface 40 and, hence, inclinometer 22 back to their respective reference positions, which in FIG. 1 are identical. It is noted that while angle $\theta$ may assume multiple values, angle $\phi$ remains a constant ninety degrees with respect to gravitational force vector 42.

Figure 2A:
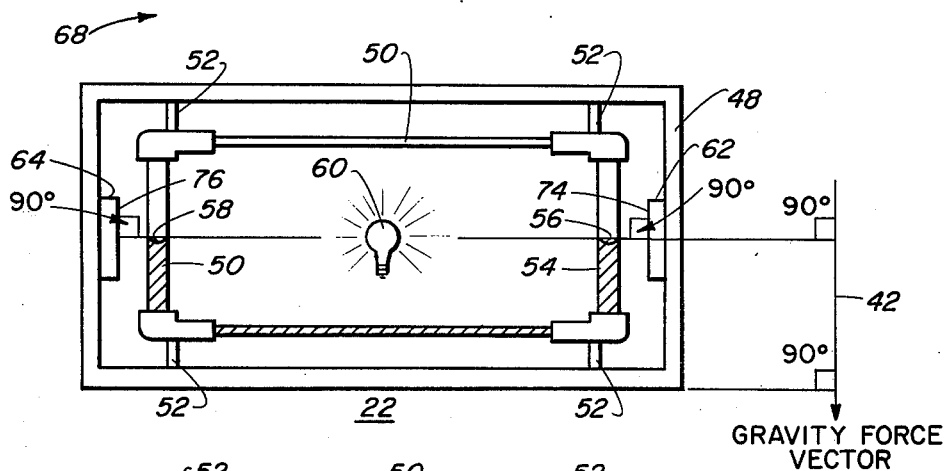
FIGS. 2a and 2b illustrates the inclinometer of FIG. 1 utilizing a rectangular manometer.

Turning to FIG. 2a, inclinometer 22 is illustrated in greater detail. Contained in opaque enclosure 48 is closed, transparent manometer 50. Manometer 50 is supported inside enclosure 48 by support 52. Manometer 50 is rectangular in shape. Manometer 50 contains different inside diameters in the horizontal and vertical tubes which provide fluid damping. Manometer 50 is partially filled with opaque liquid 54 having surfaces 56 and 58. Opaque liquid 54 can be any suitable liquid capable of withstanding the large ambient temperature variations that are commonly encountered in environments where earth-working tools are employed. For example, a water and glycol (antifreeze) mixture may be employed. A light source 60 is located inside the perimeter of manometer 50. Attached to opposite sides of enclosure 48 are solar cells 62 and 64. Solar cells 62 and 64 may be any light-to-electrical energy transducer. Solar cells 62 and 64 are disposed such that light from light source 60 passes through manometer 50 before impinging upon solar cells 62 and 64, and light from light source 60 is partially blocked from impinging upon solar cells 62 and 64 by opaque liquid 54.

Figure 2B:
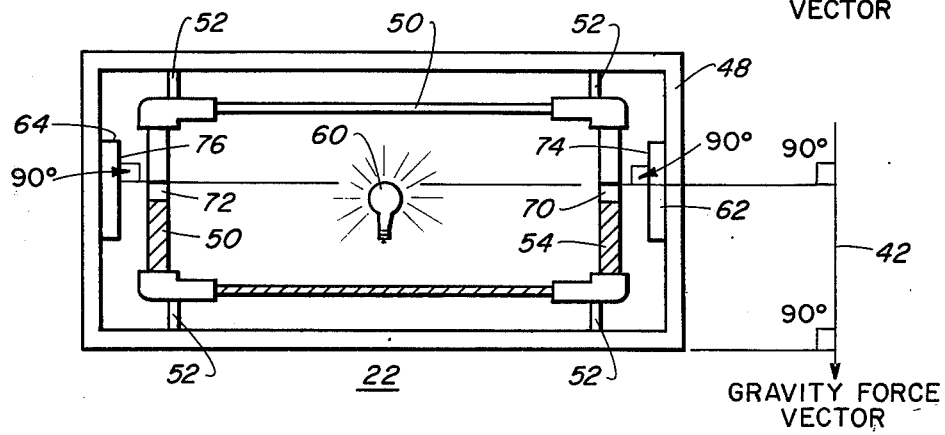

As shown in FIGS. 2a and 2b, inclinometer 22 is in the level reference position. That is, a line drawn between surfaces 56 and 58 of opaque liquid 54 forms an angle of ninety degrees with gravity force vector 42. In the level reference position, an equal amount of light impinges on both solar cells 62 and 64; hence, both solar cells 62 and 64 output identical direct current voltages. As shown in FIGS. 2a and 2b, in the reference position, the line formed by the two surfaces 56 and 58 and the surface of floats 70 and 72 is perpendicular to the faces 74 and 76 of solar cells 62 and 64. As will be discussed infra, in connection with FIG. 5, the voltage outputs of solar cells 62 and 64 are subtracted one from the other to obtain the error signal on line 26 of FIG. 1. Thus, in the level reference position, no error signal will appear on line 26 of FIG. 1. However, when inclinometer 22 is displaced from its level reference position, the amount of light impinging on solar cells 62 and 64 and, hence, the voltage outputs of solar cells 62 and 64, are no longer identical. For example, assume inclinometer 22 were tilted in the direction of arrow 68 in FIG. 2a. Then surface 56 would rise with respect to solar cell 62 and surface 58 would fall with respect to solar cell 64. Thus, the amount of light impinging upon solar cell 64 would increase while the amount of light impinging upon solar cell 62 would decrease. This would result in a larger voltage output from solar cell 64 than from solar cell 62. When subtracted one from the other, the voltage outputs of solar cells 62 and 64 form a direct current error signal of either plus or negative polarity and some magnitude. The polarity of the error signal indicates the direction of tilt inclinometer 22 has been moved with respect to its level reference position. The magnitude of the error signal is a function of the angle of displacement of inclinometer 22 with respect to the level reference position. FIG. 2b is identical to FIG. 2a except that opaque floats 70 and 72 are placed on surfaces 56 and 58, respectively. Floats 70 and 72 provide additional liquid damping, eliminate meniscus effects, and are long enough in combination with the liquid surface cohesive or tension effects to center the float in manometer 50 without touching the manometer wall and also maintain a top flat float surface perpendicular to the face of solar cells 62 and 64.

Mechanical damping in inclinometer 22 consists of viscous forces from couette flow between each float and the manometer wall which is linear, plus tubular flow of the liquid, which has a parabolic velocity distribution and is non-linear. Discharge viscous forces from manometer inside diameter variations is also non-linear. The resulting viscous damping is therefore a function of float velocity and float velocity squared. This allows a quick response for small angle deflection or displacement but retards displacement amplitude from the shocks and vibrations of the earthworking tool.

Figure 3A:
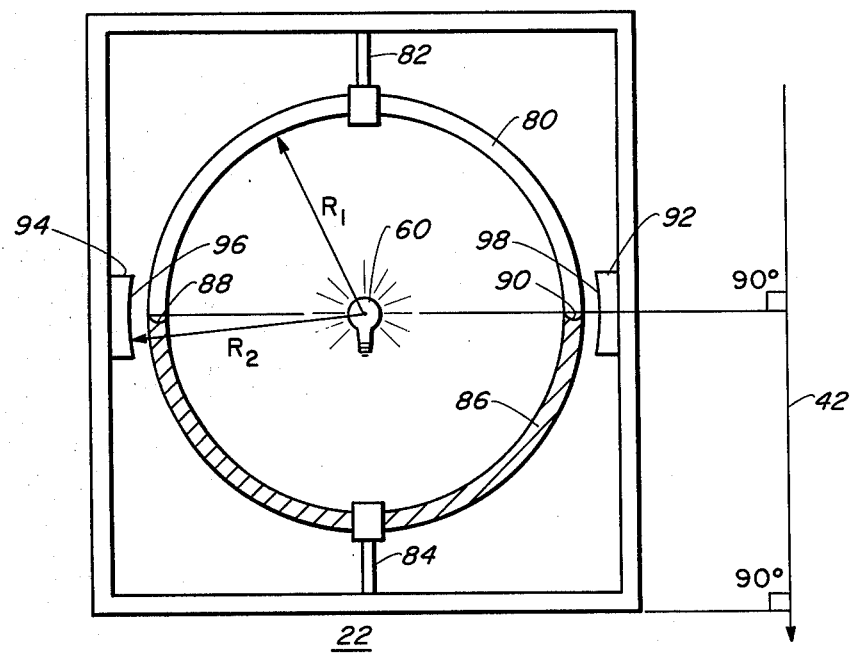
FIGS. 3a and 3b illustrates the inclinometer of FIG. 1 utilizing a circular manometer.
Figure 3B:
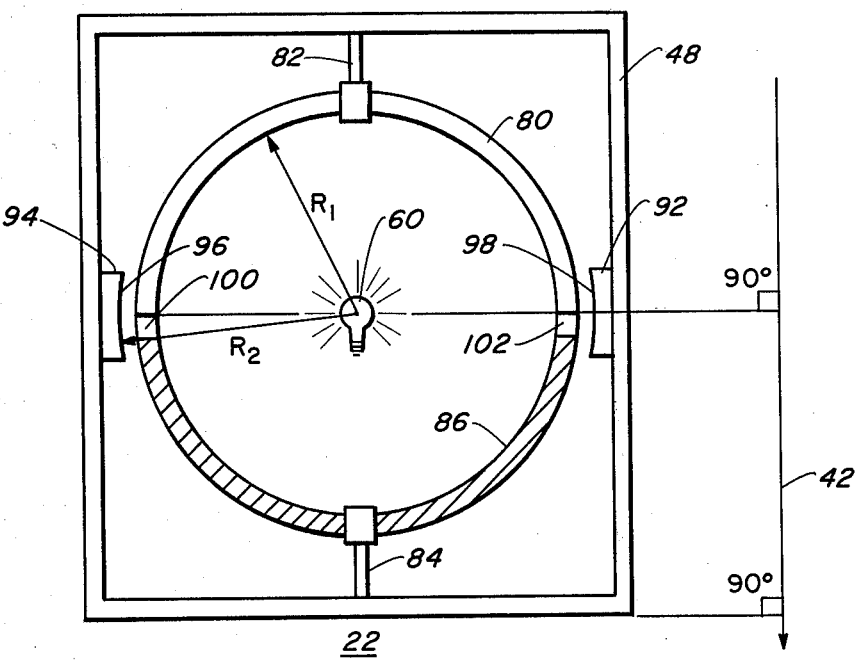

Now turning to FIG. 3a and 3b, inclinometer 22 is illustrated containing a closed, transparent, circular manometer 80 of radius $R_1$ supported inside opaque enclosure 48 by supports 82 and 84. Manometer 80 is partially filled with opaque liquid 86 forming surfaces 88 and 90. A light source 60 is located inside the perimeter of manometer 80. Solar cells 92 and 94 are disposed on opposite sides of enclosure 48 in such manner that light from light source 60 must pass through manometer 80 before impinging on solar cells 92 and 94, and light from light source 60 is partially blocked from impinging on solar cells 92 and 94 by opaque liquid 86.

Solar cells 92 and 94 have circular arc, curved surfaces 96 and 98 of radius $R_2$. Circular arc, curved surfaces 96 and 98 are sections of a right circular cylinder. Light source 60 is located at the center of circular manometer 80. A line drawn between liquid surfaces 88 and 90 forms a diameter line on circular manometer 80. A line drawn between liquid surfaces 88 and 90 or floats 100 and 102 will be perpendicular to a line tangent to the circular arc, curved surfaces 96 and 98 where the line drawn between liquid surfaces 88 and 90 or floats 100 and 102 intersects surfaces 96 and 98.

In FIG. 3a and 3b, inclinometer 22 is in the level reference position with a line drawn between liquid surfaces 88 and 90 forming a 90° angle with the gravity force vector 42. The operation of inclinometer 22 of FIGS. 3a and b is identical to inclinometer 22 of FIGS. 2a and b.

FIG. 3b is identical to FIG. 3a except that floats 100 and 102 are placed on the surface of liquid 84. The floats 100 and 102 have the identical function as floats 70 and 72 of FIG. 2b.

Figure 4A:
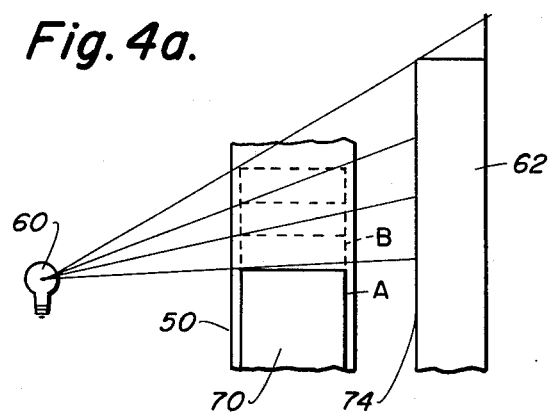
FIGS. 4a and 4b illustrates a difference between the rectangular manometer of FIG. 2 and the circular manometer of FIG. 3.

FIGS. 4a and b illustrate the difference between rectangular-shaped manometer 50 of FIGS. 2a and b and circular shaped manometer 80 of FIGS. 3a and 3b.

Figure 4B:
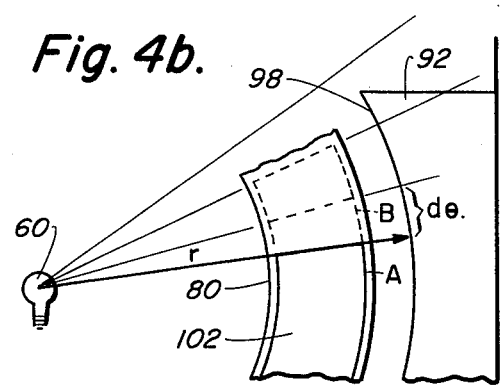

Turning to FIG. 4b, the surface 98 is a section of a right circular cylinder. As float 102 moves upward from position A to position B, an additional area $rtd\theta$ of surface 98 is prevented from receiving light from light source 60. $r$ is the radius from light source 60 to surface 98. $t$ is the width of surface 98 and is perpendicular to $r$. $d\theta_1$ is the angle swept from position A to position B. Since $r$ and $t$ are constant and only $d\theta_1$ varies, the angle of displacement from the level reference position is a linear function of the additional area of surface 98, covered by float 102 when inclinometer 22 is displaced from its level reference position. Hence, the voltage output of solar cell 92 is a linear function of the angle of displacement of inclinometer 22 with respect to the level reference position.

However, as in FIG. 4a, if the manometer is rectangular in shape, then the additional area covered by float 70 when it moves from position A to B will not be a linear function of the angle of displacement from the level reference position. As will be discussed infra in connection with FIG. 7, a linear function of the angle of displacement to the voltage level of the error signal on line 26 is desirable in some cases. For example, if the present invention maintains a controlled member 20 as in FIG. 1 in a predetermined position, a linear functional relationship is not a necessity, especially for small angles of displacement. Thus, the floats 100 and 102 or surfaces 88 and 90 need not be disposed such that a line drawn between them would be coincident with a diameter of circular manometer 80.

Figure 5:
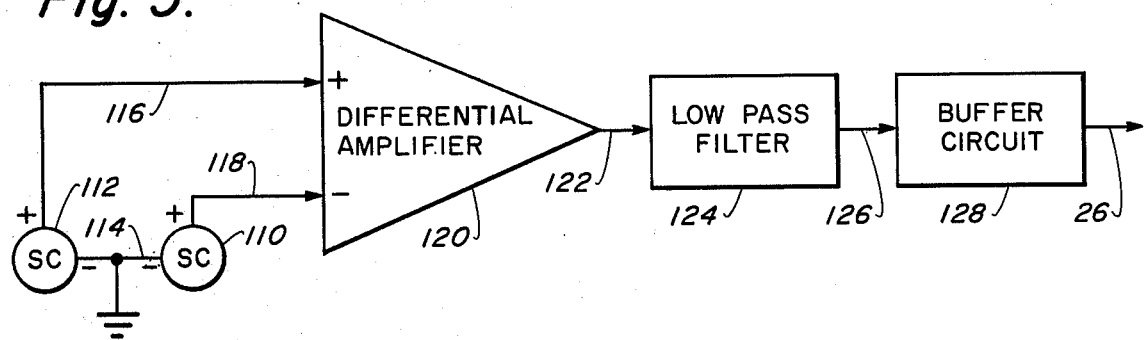
FIG. 5 is a schematic of the error signal circuit contained in the inclinometer of FIG. 1.

FIG. 5 illustrates the electronic circuitry located in inclinometer 20 of FIG. 1. Solar cells 110 and 112 represent either solar cells 62 and 64 of FIGS. 2a and 2b or solar cells 92 and 94 of FIGS. 3a and 3b. Solar cells 110 and 112 are connected to ground via line 114 from their negative terminals. The positive terminal of solar cell 112 inputs differential amplifier 120 at its positive input. The positive terminal of solar cell 110 inputs differential amplifier 120 at its negative input. Differential amplifier 120 subtracts the voltage on line 118 from the voltage on line 116, outputting on line 122 the magnitude of the difference as well as a polarity indicating which solar cell's voltage level was larger, thus signifying the direction of tilt of inclinometer 22 of FIG. 1.

The signal on line 122 passes through low pass filter 124 and appears on line 126. The signal on line 126 inputs buffer circuit 128 and appears on line 26. The signal on line 26 is the error signal of FIG. 1. The capacitance damping of low pass filter 124 attenuates any sudden changes in voltage levels due to any sudden changes in float level from shock or any high frequency float level changes due to vibrations.

As a result of the combination of mechanical and electrical damping, high stability as well as superb accuracy and rapid response is achieved.

Figure 6:
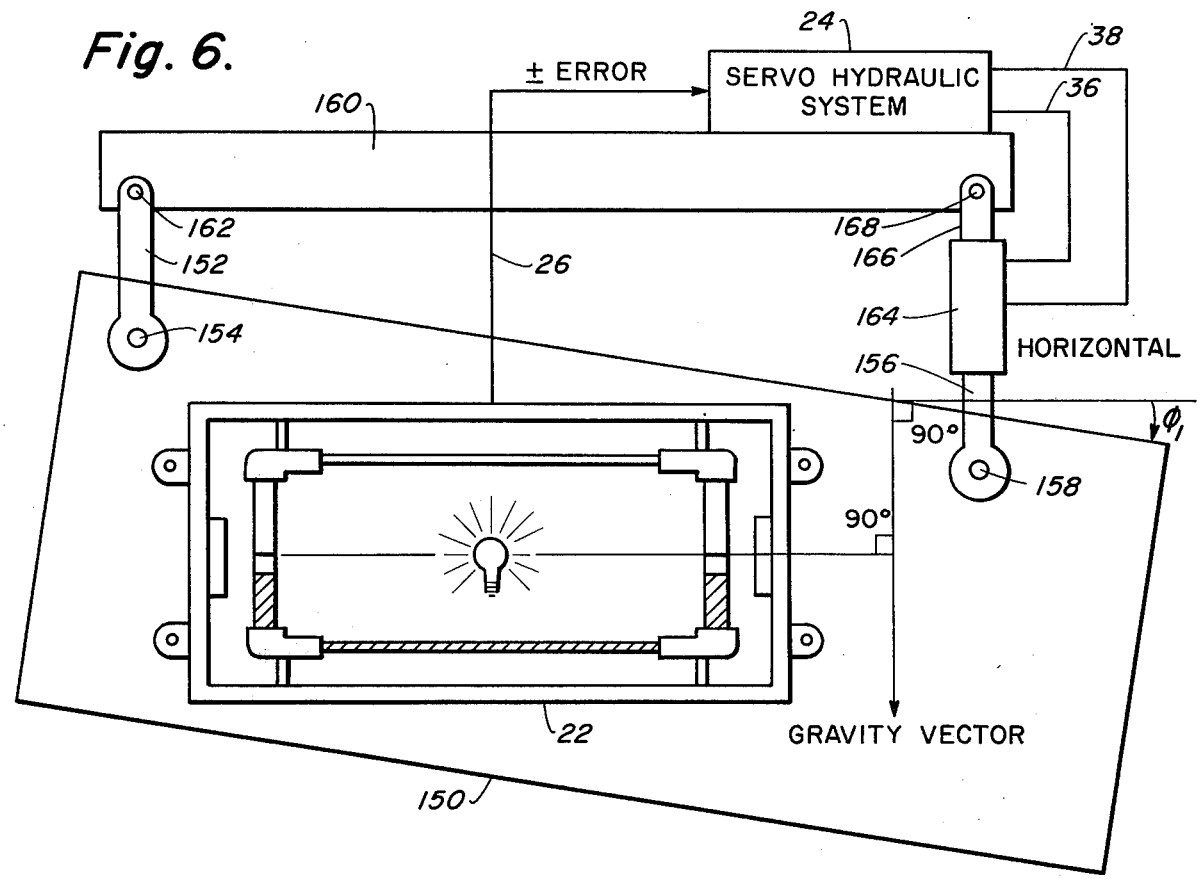
FIG. 6 illustrates the present invention controlling a grader blade.

FIG. 6 illustrates inclinometer 22 rigidly affixed to a blade 150 of an earth-working tool (not shown) so as to maintain blade 150 at an angle of $\phi_1$ with respect to the level reference position of inclinometer 22. Of course, inclinometer 22 may be pivotally affixed to blade 150 in such manner that inclinometer 22 may be controllably moved about its pivot point, thereby changing the reference position of blade 150 with respect to the level reference position of inclinometer 22.

Blade 150 is pivotally connected to arm 152 at pivot point 154 and to arm 156 at pivot point 158. Arm 152 is pivotally connected to support member 160 at pivot point 162. Arm 156 extends out of hydraulic ram 164 as does arm 166. Arm 166 is pivotally connected to support member 160 at pivot point 168. As shown in FIG. 6, inclinometer 22 is in its level reference position while blade 150 is in its reference position. As blade 150 is displaced from its reference position, inclinometer 22 outputs an error signal on line 26 which is received by servo-hydraulic system 24. In response to the error signal on line 26, servo-hydraulic system 24, via lines 36 and 38, either pushes arm 156 upward or downward until blade 150 assumes its reference position with respect to the level reference position of inclinometer 22. The level reference position of inclinometer 22 is always in a horizontal plane although not necessarily the same horizontal plane.

Figure 7:
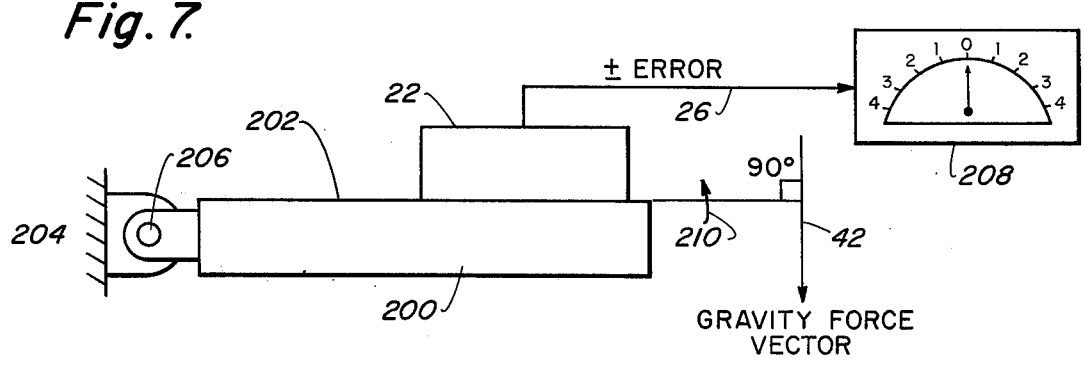
FIG. 7 illustrates a system for indicating the direction and magnitude of tilt of a member.

Now turning to FIG. 7, inclinometer 22 sits on support member 200 having surface 202. Support member 200 is pivotally connected to fixed object 204 at pivot point 206.

As shown in FIG. 7, inclinometer 22 is in its level reference position which is coincident with the reference position of surface 202 of support member 200. If support member 200 is moved upward in the direction of arrow 210, then an error signal would appear on line 26. The error signal on line 26 drives meter 208, which indicates the angle of displacement as well as the direction of displacement of surface 202, with respect to its reference position. As noted in the discussion of FIGS. 4a and 4b, it is desirable that the voltage level of the error signal on line 26 be a linear function of the magnitude of the angle of displacement. If such a linear functional relationship is not present, then electronic circuitry must be utilized to correct for non-linearity so that meter 208 will give a correct reading.

Obviously, many modifications and variations of the present invention are possible in light of the above teachings. It is therefore to be understood that within the scope of the appended claims the invention may be practiced otherwise than as specifically described herein.

We claim:
1. An automatic blade level controller system utilizing the gravitational force vector comprising:
    a. a support member;
    b. a controlled member pivotally attached to said support member;
    c. an opaque enclosure rigidly affixed to said controlled member, said opaque enclosure having a level reference position, thereby establishing a reference position for said controlled member depending upon the placement of said opaque enclosure with respect to said controlled member,
    d. a closed, transparent manometer partially filled with an opaque liquid located inside said enclosure, said liquid forming two surfaces inside said manometer;
    e. a pair of opaque floats floating respectively on the two surfaces of said liquid in said manometer each said float being shaped such that in combination with the liquid surface cohesive or tension effects each said float is centered in said manometer without touching the manometer wall thereby eliminating columb friction forces and providing linear viscous forces from couette flow between each said float and its respective manometer wall whereby undesirable hysteresis effects are eliminated, said floats having flat top surfaces.
    f. a light source located inside the perimeter of said manometer;
    g. a first and a second light detecting means located on opposite sides of said light source, light from said light source passing through said manometer in order to strike said first and second light detecting means, light from said light source being partially blocked from impinging upon said first and second light detecting means by said surfaces of said floats on each side of said manometer, each said first and second light detecting means outputting a direct current voltage level proportional to the amount of light impinging, thereon, each said light detecting means receiving an equal amount of light from said light source when said level sensing means is in said level reference position; and
    h. an error signal being generated by voltage differences when each said light detecting means receives different amounts of light from said light source, and
    i. means connected between said support member and said controlled member and receiving said error signal for returning said controlled member to its reference position.

2. The automatic level controller of claim 1 wherein said voltage differences are obtained from a circuit for subtracting the voltage output of said first light detecting means from the voltage output of said second light detecting means.

3. The automatic blade level controller system of claim 1 wherein said manometer is rectangular in shape and said first and second light detecting means have flat surfaces for receiving light.

4. The automatic level controller of claim 1 wherein said manometer is circular in shape and said first and second light detecting means have light receiving surfaces shaped as sections of a right circular cylinder whose radius is equal to the distance from said light source to said light detecting means.

5. The automatic blade level controller of claim 4 wherein the two floats are disposed such that a straight line drawn between their tops is coincident with a diameter of said circular manometer.

* * * * *